April 28, 1931.　　　E. G. GARTIN　　　1,803,243
TOOL MOUNTING
Filed July 27, 1928
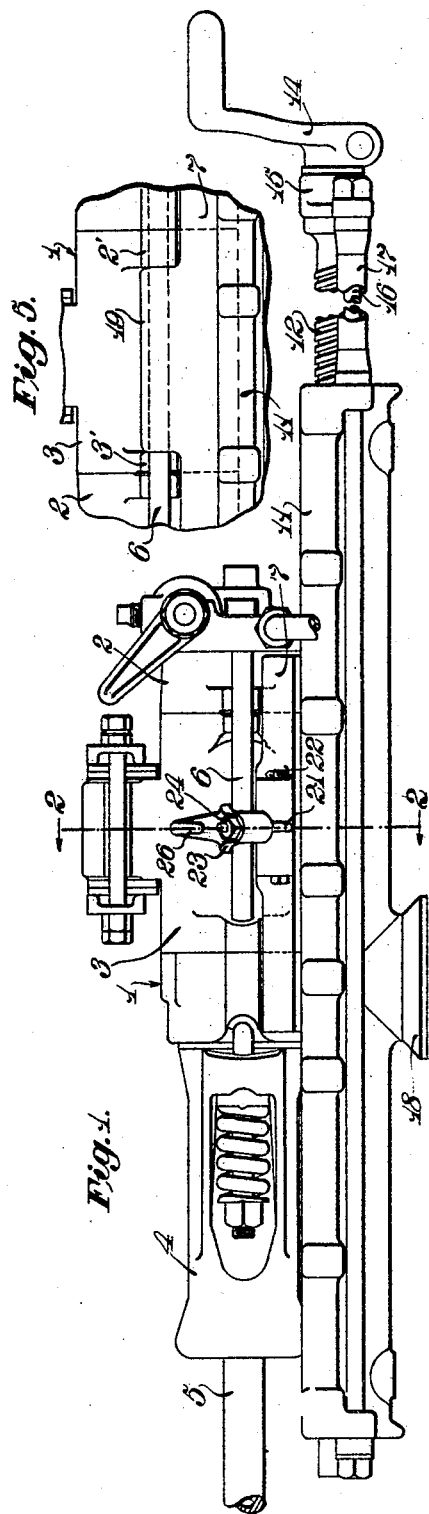
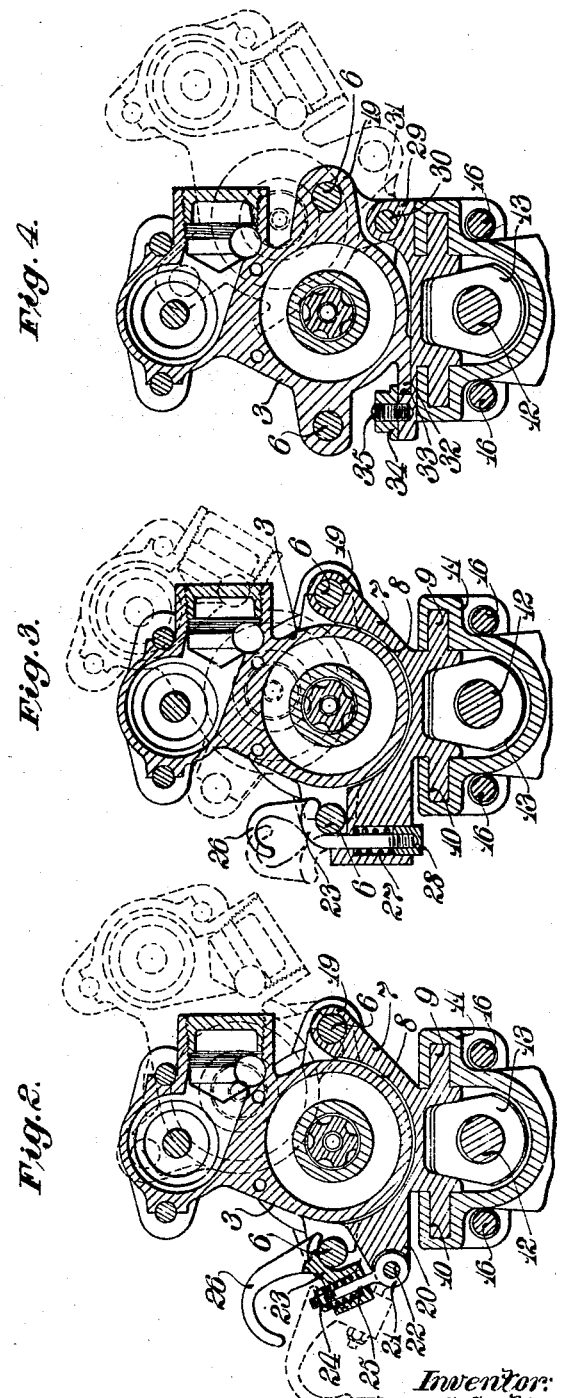
Inventor:
Elmer G. Gartin.
By Louis A. Maxson
Atty.

Patented Apr. 28, 1931

1,803,243

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

TOOL MOUNTING

Application filed July 27, 1928. Serial No. 295,813.

My invention relates to tool mountings, and particularly to mountings for rock drills permitting the hammering motor to be swung to one side while the drill steel is being changed.

One of the objects of the invention is to provide an improved tool mounting permitting the actuating device for the tool to be moved laterally relative to the mounting. Another object is to provide an improved mounting for rock drills. A more specific object is to provide an improved mounting for rock drills having a pivotal connection between the drill and cradle whereby the drill may be swung off center to permit changing of drill steels. Still another object of the invention is to provide, in a drill mounting of the type specified, means whereby the drill may be quickly released and moved out of the way to permit changing of the drill steel. Other objects and advantages of the invention will hereinafter more fully appear.

In the accompanying drawings I have shown for purposes of illustration three specific forms which my invention may assume in practice.

In these drawings,—

Fig. 1 illustrates a rock drill and a mounting therefor embodying my invention.

Fig. 2 is a vertical transverse section through the drill and mounting on line 2—2 of Fig. 1.

Fig. 3 is a view corresponding to Fig. 2, of a modification.

Fig. 4 is another view similar to Fig. 2, showing a still further modification.

Fig. 5 is a partial view in side elevation looking at the reverse side of Fig. 1.

In Fig. 1 of the drawings I have shown a rock drill generally designated 1 made up of a plurality of separable sections comprising a head block 2, a central cylinder member 3, and a chuck housing 4, in which is loosely mounted a drill steel 5. The several sections are held in assembled relation by the usual side rods 6 passing through lateral lugs upon each of the sections. The drill is adapted to be supported by a cradle 7 which has a semicylindrical recess 8 adapted to fit the cylinder of the drill. The cradle is provided with usual guides 9 which are slidably mounted in ways 10 of the usual shell mounting 11. The feed screw 12 is rotatably mounted in bearings on the shell 11 and passes through a feed nut 13 fixed to the cradle. For the purpose of supporting the outer end of the feed screw and the handle 14 there is provided a bearing 15 which is supported upon the shell by means of rods 16 and sleeve 17. The shell is provided with the usual conical 18 which is adapted to be mounted on the usual tripod.

The invention is directed particularly to the connection between the drill and cradle. For this purpose the cradle is provided with a lateral lug 19 which provides a bearing through which one of the side rods passes so as to allow the drill cylinder to be swung about one of its side rods while being supported on the cradle. The length of lug 19 is such as to fit between a pair of lugs 2' and 3' on the drill cylinder as shown in Fig. 5. This construction effectively prevents relative longitudinal movement between the drill and cradle. On the opposite side of the cradle extends another lug 20 to which is connected an eyebolt 21 by means of a pin 22 passing through the eye of said bolt. A hook 23 is slidably mounted on this eyebolt, being retained in position by a nut 24 and a spring 25 surrounding the bolt between the retaining nut and the hook which may if desired be housed in a part of the hook, thus providing a resilient connection for the hook. The hook member is provided with a handle portion 26 which may be grasped by the operator and lifted against the tension of the spring 25 to permit the hook to be engaged over one of the side rods 6. It will of course be apparent that if desired other means than the side rods may be employed for providing the pivotal bearing and also the hook may be made to engage any suitable lug or pin on the drill other than the side rod.

In the modified construction illustrated in Fig. 3 the lateral lug opposite the pivotal bearing is formed somewhat differently than in the construction shown in Fig. 2 so as to provide a sliding bearing for the hook member 23. The spring which is here designated 27 is mounted in a recess in the lug and a retaining nut 28 on the end of the hook member slides in this recess. The hook may thus be turned about its own longitudinal axis as shown in dotted lines and the construction has the advantage of added simplicity due to the elimination of the eyebolt element.

In Fig. 4 the construction is somewhat further modified. Instead of the side rods 6 passing through a lug on the cradle to provide a pivotal connection, there is provided a shorter lug 29 on the cradle which forms a bearing for a pin 30 passing through lateral lugs 31 formed integral with the drill cylinder. At the opposite side a straight lug 32 is formed on the cylinder which is adapted to fit into a recess 33 on the cradle. A nut 34 secured to the cradle by means of a stud bolt 35 is adapted to engage the lug 32 for holding the drill in fixed position on the cradle.

The operation of the device above described will now be readily apparent. When it is desired to change the drill steel, the feed screw 12 may be operated to withdraw the steel a short distance from the bottom of the hole to provide the necessary clearance to permit removal of the steel from the chuck housing 4. The operator now takes hold of the portion 26 and releases the hook connection allowing the hook to be moved into the position shown in dotted lines in Figs. 2 and 3. The drill may now be swung about the side rod as a pivot into the position indicated in dotted lines in Figs. 2 and 3. The drill is now out of the path of the drill steel which may be removed from the hole and a new steel of the desired length substituted. The drill is adjusted to the desired position by means of the feed screw and again swung into the full line position and the hook engaged over the side rods opposite the pivot joint. The new drill steel may now be connected to the chuck housing in the usual manner and operation resumed. In the use of the modified construction shown in Fig. 4 the operations are the same except that instead of releasing the hook from the side rod, the nut 34 is taken off, thereby allowing the drill to be swung about its pivot 30.

As a result of my invention it will be observed that a quick detachable connection is provided between the rock drill and the cradle which supports it, whereby the drill may be easily and quickly swung off center to permit ready changing of the drill steel. This eliminates the necessity of moving the whole supporting structure, which in drills of the larger sizes may be of considerable weight. It also insures the accurate re-positioning of the drill after a change of steel.

While I have in this application specifically described three forms which my invention may assume in practice, it will be understood that these forms are shown for purposes of illustration and that the invention may be modified and embodied in various other forms without departing from its spirit or the scope of the appended claims.

What I claim as new and desire to secure by Letters Patent is:

1. A mounting for rock drills including means for supporting the drill, a rock drill thereon made up of a plurality of separable parts and having parallel side rods for holding the parts thereof together, a pivotal connection between one of said side rods and said supporting means whereby said drill may be swung laterally relative to said supporting means about an axis offset from the longitudinal center line of the drill, and releasable means engageable with the other side rod for holding the drill in operative position on said supporting means.

2. A mounting for rock drills including means for supporting the drill, a rock drill thereon made up of a plurality of separable parts and having parallel side rods for holding the parts thereof together, a pivotal connection between said drill and said supporting means including a bearing carried by said supporting means for receiving one of said side rods to permit pivotal movement of the drill relative to said supporting means, and releasable means engageable with the other side rod for holding the drill in operative position on said supporting means.

3. A mounting for rock drills including a means for supporting the drill, a rock drill thereon made up of a plurality of separable parts and having parallel side rods for holding the parts thereof together, a pivotal connection between said drill and said supporting means including a bearing carried by said supporting means for receiving one of said side rods and engaging the latter within its holding limits to permit pivotal movement of the drill relative to said supporting means, and spaced lugs on said drill between which said bearing projects to hold said drill against longitudinal movement relative to said supporting means.

4. A mounting for rock drills including a cradle adapted to be slidably mounted on a guide shell, a rock drill mounted on said cradle and made up of separable parts and having parallel side rods for holding the parts thereof together, a pivotal connection between one of said side rods and said cradle whereby the drill may be swung, without detaching said side rods, relative to said cradle about an axis offset from the longitudinal center line of the drill, and a releasable holding device for maintaining said drill in operative position on said cradle.

5. A mounting for rock drills including a cradle adapted to be slidably mounted on a guide shell, a rock drill mounted on said cradle and made up of separable parts and having parallel side rods for holding the parts thereof together, a pivotal connection between one of said side rods and said cradle whereby the drill may be swung relative to said cradle about an axis offset from the longitudinal center line of the drill, and a releasable holding device engaging the other side rod for maintaining said drill in operative position on said cradle.

In testimony whereof I affix my signature.

ELMER G. GARTIN.